United States Patent
Tsunehara et al.

(10) Patent No.: US 8,165,620 B2
(45) Date of Patent: Apr. 24, 2012

(54) RADIO COMMUNICATION APPARATUS WITH A BUS DEDICATED TO DATA TRANSMISSION

(75) Inventors: Katsuhiko Tsunehara, Hachioji (JP); Hirotake Ishii, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/209,713

(22) Filed: Aug. 24, 2005

(65) Prior Publication Data
US 2006/0046771 A1 Mar. 2, 2006

(30) Foreign Application Priority Data
Sep. 1, 2004 (JP) ................................ 2004-253730

(51) Int. Cl.
*H04M 1/00* (2006.01)
(52) U.S. Cl. ............... 455/550.1; 455/432.3; 455/552.1; 326/47; 709/202
(58) Field of Classification Search .......... 455/550, 455/552.1, 550.1, 432.3; 714/47; 709/202; 326/47
See application file for complete search history.

(56) References Cited

U.S. PATENT DOCUMENTS

| | | | | |
|---|---|---|---|---|
| 5,526,376 A * | 6/1996 | Kellenberger et al. | ........ | 375/211 |
| 5,835,096 A * | 11/1998 | Baldwin | ......... | 345/582 |
| 6,072,994 A * | 6/2000 | Phillips et al. | ......... | 455/84 |
| 6,076,129 A * | 6/2000 | Fenwick et al. | ......... | 710/305 |
| 6,725,341 B1 | 4/2004 | Peir et al. | | |
| 7,142,251 B2 * | 11/2006 | Sha et al. | ......... | 348/557 |
| 2002/0059508 A1* | 5/2002 | Lentz et al. | ......... | 712/15 |
| 2002/0173338 A1* | 11/2002 | Neumann et al. | ......... | 455/552 |
| 2003/0181218 A1* | 9/2003 | Mukai et al. | ......... | 455/550.1 |
| 2004/0002339 A1* | 1/2004 | O'Connor | ......... | 455/450 |
| 2004/0043785 A1* | 3/2004 | Izaki | ......... | 455/550.1 |
| 2004/0116151 A1* | 6/2004 | Bosch et al. | ......... | 455/550.1 |
| 2004/0242261 A1* | 12/2004 | Fette | ......... | 455/550.1 |
| 2005/0243756 A1* | 11/2005 | Cleveland et al. | ......... | 370/328 |
| 2006/0003760 A1 | 1/2006 | Li et al. | | |

FOREIGN PATENT DOCUMENTS

| | | |
|---|---|---|
| CN | 1431841 A | 7/2003 |
| CN | 1447940 A | 10/2003 |
| JP | 11-265342 A | 9/1999 |
| JP | 2003-37655 A | 2/2003 |
| JP | 2003-283651 | 10/2003 |
| JP | 2003-337805 | 11/2003 |

* cited by examiner

*Primary Examiner* — Dwayne Bost
*Assistant Examiner* — Amancio Gonzalez
(74) *Attorney, Agent, or Firm* — Mattingly & Malur, P.C.

(57) ABSTRACT

Disclosed is the hardware construction of a radio communication apparatus that can meet advanced radio communications. A control bus for transferring control signals between a main processor and components is separated from a data bus for transferring transmission/receive signals between processor units including sub-processors and an external interface. The sub-processors constitute the processor units, and a software defined radio of the present invention may include plural processor units. The processor units are connected by a dedicated interunit interface. The processor units may include multiple sub-processors, which are connected serially through an interprocessor interface.

13 Claims, 9 Drawing Sheets

RADIO COMMUNICATION APPARATUS WITH A BUS DEDICATED TO DATA TRANSMISSION

CLAIM OF PRIORITY

The present application claims priority from Japanese application JP 2004-253730 filed on Sep. 1, 2004, the content of which is hereby incorporated by reference into this application.

FIELD OF THE INVENTION

The present invention relates to a radio communication apparatus and more particularly to a radio communication apparatus that includes one or plural processor units connected in parallel, each of which performs signal processing for transmission/receive signals.

BACKGROUND OF THE INVENTION

As mobile communication and radio access technology are finding widespread use, various radio communication systems such as cellular communication, wireless LAN, and DSRC (Dedicated Short Range Communication) have come into existence. To further advance these existing radio communication systems, including an increase in communication speeds, the functions of the radio communication system will be added and changed. In addition to these existing radio communication systems, a study is being made to come up with new radio communication systems, such as MBWA (Mobile Broadband Wireless Access) being drawn up in the IEEE802. 20 Committee.

A possible radio communication apparatus to cope with such situations in which diversified radio communication systems exist is a software defined radio. The software defined radio is a radio communication apparatus that can accommodate various radio communication systems by modifying software.

Generally, the processing amount of signal processing of radio communication is extremely large. Accordingly, a high signal processing capability is requested for the software defined radio. Therefore, a study is being made of a method of configuring the software defined radio with hardware provided with plural processors.

A method of configuring a software defined radio using hardware provided with plural processors is disclosed in JP-A No. 283651/2003. The construction of a software defined radio disclosed in JP-A No. 283651/2003 is shown in FIG. 14. For example, in the case of receive, a radio signal received in an antenna 1 is subjected to signal processing for demodulation in a radio transceiver 2, a signal processing circuit 3, a second processor 21, and a first processor 11, and then is outputted from an input-output device 15 through a bus 4B. On the other hand, in the case of transmission, a transmission signal inputted from the input-output device 15 is inputted to the first processor 11 through the bus 4B, further subjected to signal processing in the second processor 21, the signal processing circuit 3, and the radio transceiver 2, and then transmitted from the antenna 1.

In JP-A No. 283651/2003, a software defined radio to which a third processor is added as shown in FIG. 15 is also disclosed. In this case, a signal transmitted and received is subjected to signal processing in a third processor 31 in addition to the antenna 1, the radio transceiver 2, the signal processing circuit 3, and the second processor 21, and the first processor 11, and inputted and outputted to and from an external device in the input-output device 15 through the bus 4C. Moreover, in this case, the second processor at least controls the signal processing circuit 3.

SUMMARY OF THE INVENTION

A first problem is described below. As radio communication speeds up, the transmission speed of transmission/receive signal becomes higher than a current transmission speed. For the multitask in which plural radio communication systems are concurrently used, the transmission speed of a transmission/receive signal becomes equal to the sum of the transmission speeds of individual radio communication systems. Therefore, the transmission speed of a transmission/receive signal in an entire radio apparatus is larger in comparison with the case where only a single radio communication system is used. A conceivable usage form of the multitask is the downloading of data over a radio LAN in the course of voice communication over a cellular phone.

For example, with a radio apparatus of a conventional construction as shown in FIG. 14, all transmission/receive signals are transferred to and from the outside through the input-output device 15 connected to the bus 4B. Therefore, all transmission/receive signals pass through the bus 4B. Hence, when the speedup of radio communication and accommodation to multitask as described above causes an increase of the transmission speed of transmission/receive signal, the transmission capability of the bus 4B becomes insufficient, possibly disabling normal operation of the radio apparatus.

For example, when the transmission speed of transmission/receive signal exceeds the transfer capability of the bus 4B, the transmission/receive signal will not be normally transferred. For example, when the transmission speed of the transmission/receive signal occupies the majority of the transfer capability of the bus 4B, transfer delay increases in control information transfer performed through the bus 4B, such as access to the data memory 13 by the first processor 11 and transfer of control signals to the second processor 21, causing control delay. As a result, the radio apparatus is not controlled as expected, and may be unable to operate normally. The first problem is to realize a radio communication apparatus that can operate without transfer delay and control delay even when the transmission speed of transmission/receive signal increases.

A second problem is described below. As radio communication becomes more advanced, a software defined radio is required to have higher processing capability. Therefore, it is desirable that a software defined radio is constructed to be provided with higher processing capability, for example, by adding processors. However, JP-A No. 283651/2003 requires a technique for providing two or more of the second processor 21 in the construction as shown in FIG. 14.

A technique available to provide two or more of the second processor 21 shown in FIG. 14 is disclosed in JP-A No. 337805/2003. JP-A No. 337805/2003 discloses a method of connecting plural processors by a crossbar switch. However, generally, a crossbar-based construction exponentially increases the amount of wiring with an increase in the number of processors and extremely expands a hardware scale. The expansion of hardware scale causes the upsizing and higher cost of a radio apparatus and reduces the usability of a software defined radio. The second problem is to realize a radio communication apparatus of a small-sized hardware construction that enables efficient communication between plural processors.

A third problem is described below. With the method described in JP-A No. 283651/2003, the second processor 21 controls the signal processing circuit 3, in the construction of FIG. 15. In this case, a control signal outputted from the second processor 21 is inputted to the signal processing circuit 3 through at least the bus 4B, the interface 5A, and the bus 4A. Generally, delay occurs in signal transfer by use of a bus, and a delay amount depends on the traffic quantity of the bus. Accordingly, when the second processor 21 controls the signal processing circuit 3 in FIG. 15, control delay may increase. Therefore, the radio apparatus having the construction of FIG. 15 may not meet radio communication systems including processing that is severe in time restriction of control delay. One example of radio communication systems that are severe in time restriction of control delay is a radio LAN (IEEE802.11) that dictates transmission of an Ack signal for a receive signal 10 microseconds later. A third problem is to realize a construction that allows efficient cooperation among plural processors required to meet the speedup of radio communication and communication by different protocols.

To solve the above-mentioned first problem, the present invention individually provides a data bus for transferring transmission/receive signals and a control bus for transferring control signals. To solve the above-mentioned second problem, the present invention connects plural processors serially through an interprocessor interface. Furthermore, to solve the above-mentioned third problem, the present invention unitizes processors and peripheral circuits and provides dedicated interfaces for connecting pertinent units.

By the hardware construction of the present invention, a software defined radio can be constructed which can avoid abnormal operation due to the lack of bus transfer capability and transfer delay even when the speedup of radio communication and accommodation to multitask causes an increase of the transmission speed of transmission/receive signal.

When advances in radio communication require signal processing by plural processors, use of a method of connecting plural processors of the present invention helps to cover the signal processing of the advanced radio communication by plural processors while curbing an increase in hardware scale. As a result, radio apparatuses can be miniaturized and reduced in costs, so that the usability of software defined apparatuses can be increased.

Furthermore, by directly connecting processor units by an interunit interface of the present invention, delay of signal transfer between units can be reduced, and a software defined radio can be constructed which can accommodate radio communication systems that are severe in time restriction.

DETAILED DESCRIPTION OF THE PREFERRED EMBODIMENTS

Figure 1:
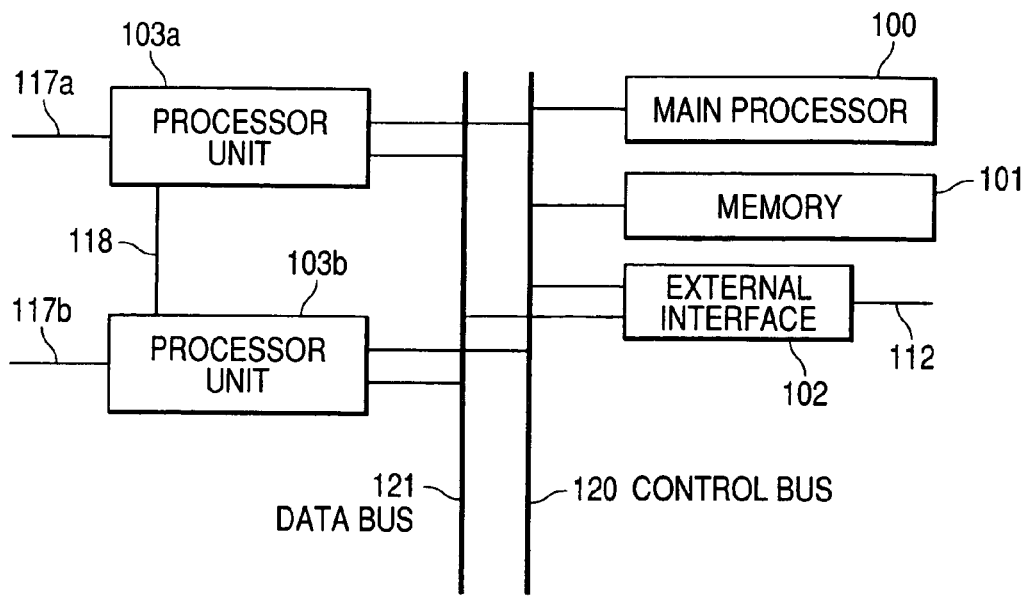
FIG. 1 is a drawing showing the hardware construction of a radio communication apparatus of the present invention.

FIG. 1 shows an example of a radio communication apparatus of the present invention. A software defined radio of the present invention comprises a main processor 100, a memory 101, an external interface 102, and processor units 103a and 103b. These components are connected through both or one of a control bus 120 and a data bus 121. Though the description below assumes that there are two processor units, the number of processor units may be one, or three or more.

The main processor 100 controls the entire software defined radio and the processor units 103a and 103b. The main processor 100, mainly in conjunction with the processor units 103a and 103b, performs signal processing such as protocol control of radio communication that is small in the amount of processing and loose in time restriction. A common CPU may be used as the main processor 100.

The memory 101 is used as a work memory for processing by the main processor 100. The memory 101 may be used as a program memory for storing programs that define the operation of the main processor 100 and the processor units 103a and 103b. As the memory 101, for example, a general-purpose SRAM and DRAM, a flash memory, and the like may be used.

The external interface 102, which is connected with external devices through the signal line 112, provides an interface for exchanging signals between the software defined radio and the external devices. The external devices include, e.g., display units, personal computers, loudspeakers, and microphones. As an interface specification, e.g., USB may be used.

The processor units 103a and 103b perform signal processing necessary to realize radio communication. Specifically, the processor units 103a and 103b perform signal processing that is large in the amount of processing and severe in time restriction, such as the modulation and demodulation of transmission/receive signals, error control processing, waveform shaping, and the like. The processor units 103a and 103b may perform different signal processings for radio communication; for example, the processor unit 103a performs radio LAN signal processing, and 103b performs cellular communication signal processing. Thereby, the software defined radio can provide for concurrent use of the two radio communication systems, or so-called multitask. Or the processor units 103a and 103b may share burden of signal processing for achieving one radio communication, such as transmission processing and receive processing.

The processor units 103a and 103b are, through signal lines 117a and 117b, respectively, connected with an analog front-end that provides an interface between analog and digital signals, a radio signal processing unit that modulates and demodulates analog signals, and an antenna unit that transfers and receives signals of radio frequency. In FIG. 1, for simplicity, the above-mentioned analog front-end, the radio signal processing unit, and the antenna are not shown. The processor units 103*a* and 103*b* comprise sub-processors and signal processing circuits. The construction of the processor units 103*a* and 103*b* will be described later.

Generally, in the radio communication apparatus, various signals are transferred among different components. Signals transferred during radio communication mainly include control signals for controlling components and data signals for transmission and reception by the radio communication.

The control signals have characteristics described below. The control signals are generally intermittently transferred, and their transmission quantity is small. The control signals are transferred in the form of various connections such as between the main processor and other components, and among the other components. The control signals comprise signals of various types such as control information of various flags, and parameters that define the operation of components. Therefore, the control signals include signals of various constructions from one-bit logical information to multiple-bit numeric information. It is desirable that high-level functions such as interrupt and DMA transmission can be used for transmission of the control signals. The control signal having the above-mentioned characteristics are transferred mainly around the main processor 100.

On the other hand, the data signals have the following characteristics. Data signals comprising transmission/receive data are continuously transferred, and their transmission quantity is large and will become larger in future as radio communication becomes faster. During multitask in which plural radio communication systems are concurrently used, the transmission quantity of the data signals become larger according to the number of radio communication systems used concurrently. The data signals are transferred between the processor units 103*a* and 103*b*, and the external interface 102. The data signals essentially consist of logic information having a width of one bit. When the processor units 103*a* and 103*b* realize different radio communication systems during multitask, since signal transmission in the radio communication systems is basically independent between the processor units, data signal transmission by the processor units 103*a* and 103*b* occur independently between the processor units. In multitask, for example, when voice communication is performed using the processor unit 103*a*, and data communication is performed using the processor unit 103*b*, external devices connected through the external interface 102 may be different for different processor units. Therefore, it is desirable that data transfers by different processor units have independency so as to exert no influence on each other.

As has been described above, in the radio communication apparatus of the present invention, two types of signals having different nature, control signals and data signals, are transferred. Accordingly, when these signals are transferred on a single bus, an efficient bus structure might be used for transmission of one type of signals, while an inefficient bus structure might be used for transmission of the other type of signals. Moreover, when these signals are transferred on a single bus, the transmission of data signals having a large transmission quantity presses the transmission of control signals, possibly delaying the transmission of the control signals.

In view of the above-mentioned characteristics of control signal transmission and data signal transmission that are specific to radio communication, the software defined radio of the present invention has, as shown in FIG. 1, a control bus that has a structure suitable for transmission of control signals and is exclusively used for transmission of control signals, and a data bus that has a structure suitable for transmission of data signals and is exclusively used for transmission of data signals. Hereinafter, the construction of the control bus and the data bus will be described.

The main processor 100, the memory 101, and the external interface 102, and the processor units 103*a* and 103*b* are connected with the control bus 120. The control bus 120 is used for the transmission of control signals, parameters, variable data, and the like among the above-mentioned components. Specifically, the control bus 120 is used for parameter setting and control command transmission to the external interface 102 and the processor units 103*a* and 103*b* from the main processor 100, or internal state report, interrupt, and the like to the main processor 100 from the external interface 102 and the processor units 103*a* and 103*b*. The control bus 120 is also used when variable data and the like necessary for processing performed by the main processor 100 are read from or written to the memory 101 by the main processor 100. As the control bus 120, general-purpose buses such as PCI bus and VME bus may be used. In these buses, components connected to the buses specify the address of a destination device when transmitting data, and receive data with an address destined for the devices from among data transferred on the buses.

The external interface 102, and the processor units 103*a* and 103*b* are connected to the data bus 121. The data bus 121 is used for the transfer of receive data from the processor units 103*a* and 103*b* to the external interface 102 that is required when data received and demodulated by this software defined radio is outputted to an external device. Also, the data bus 121 is used for the transfer of transmission data from the external interface 102 to the processor units 103*a* and 103*b* that is required when data inputted from an external device is modulated and transmitted by this software defined radio. Thus, by providing the data bus used for the transmission of the transmission/receive data aside from the control bus, control data transferred on the control bus can be transferred by a delay quantity that is independent of the amount of transmission/receive data. Since the data bus does not need to handle control signals of high priority, transmission/receive data can be efficiently transferred.

Figure 2:
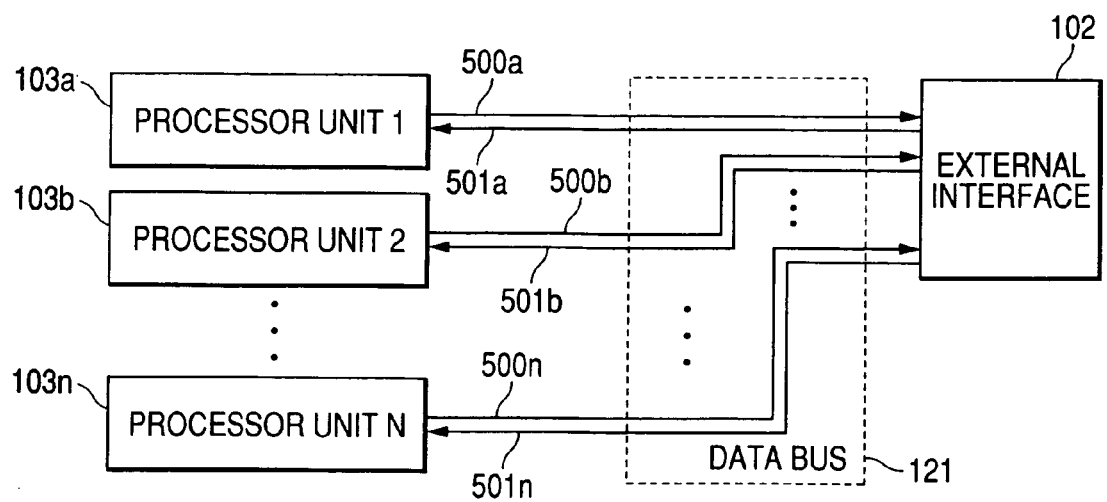
FIG. 2 is a drawing showing a first example of the construction of a data bus.

FIG. 2 shows an example of the construction of the data bus 121. In FIG. 2, signals outputted from the processor units 103*a*, 103*b*, and 103*n* are transferred to the external interface 102 through independent signal lines 500*a*, 500*b*, and 500*n*, respectively. Signals inputted to the processor units 103*a*, 103*b*, and 103*n* are transferred from the external interface 102 through independent signal lines 501*a*, 501*b*, and 501*n*, respectively. The data bus 121 comprises a set of the independent signal lines 500*a*-*n* and 501*a*-*n*.

As described above, in the construction of FIG. 2, transmission/receive data transferred between the processor units and the external interface 102 is transmitted through independent signal lines. Accordingly, transfer speed and transfer timing of transmission/receive data transferred between the processor units and the external interface 102 can have a high degree of freedom. Since the processor units can occupy the signal lines, control on the transfer of transmission/receive data is simple, and hardware construction can be simplified. As a result, by providing the data bus having the construction of FIG. 2, a software defined radio having a high degree of freedom can be realized with simple hardware construction. In FIG. 2, for simplicity, though each of the signal lines 500*a*, 500*b*, 500*n*, 501*a*, 501*b*, and 501*n* is shown by only one line, the signal lines may comprise plural signal lines, respectively. In this embodiment, since the processor units are connected with the external interface 102 by dedicated signal lines, data transfer can be performed without attaching address information. In this case, the effect of reducing overhead is obtained.

Figure 3:
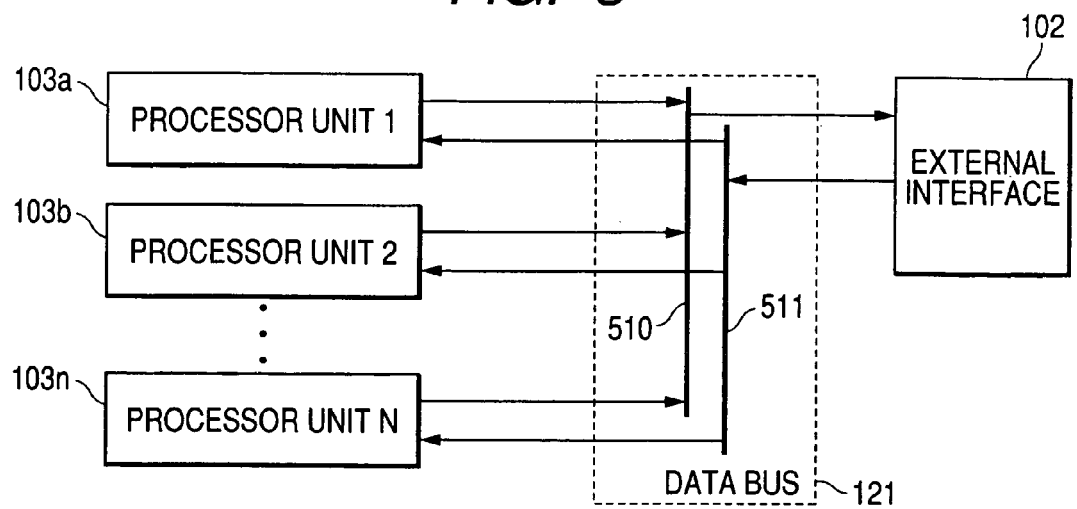
FIG. 3 is a drawing showing a second example of the construction of a data bus.

FIG. 3 shows a second example of the construction of the data bus 121. In FIG. 3, signals outputted from the processor units 103a, 103b, and 103n are transferred to the external interface 102 through a common signal line 510. Signals inputted to the processor units 103a, 103b, and 103n are transferred from the external interface 102 through a common signal line 511.

Figure 6:
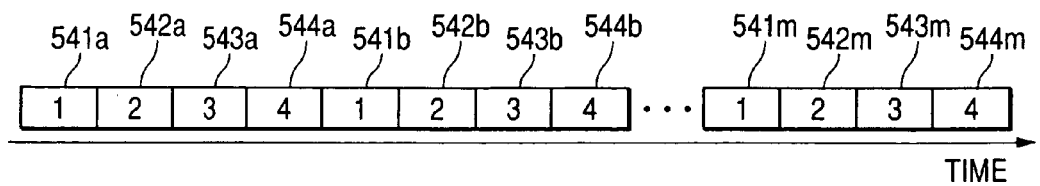
FIG. 6 is a drawing showing a first example of a method of sharing a signal line of a data bus.

FIG. 6 shows a first example of a method of sharing the signal line 510. The same is also true for a method of sharing the signal line 511. In this example, as shown in FIG. 6, by setting time slots 541a, 542b, and so forth on a time axis, and assigning the time slots to the processor units, the signal line 510 is shared by the multiple processor units. Specifically, for example, as shown in FIG. 6, time slots are set so that four time slots (541a, 542a, 543a, 544a) are repeated (corresponding to processor's subscripts a, b . . . n). For example, by assigning a first time slot group to the processor unit 103a of FIG. 3, the processor unit 103a can perform data transfer in the time slots 541a, and 541b . . . 541m.

Similarly, for example, by assigning a second time slot group to the processor unit 103b of FIG. 3, the processor unit 103b can perform data transfer in the time slots 542a, and 542b . . . 542m. Furthermore, by assigning a third time slot group to the processor unit 103n of FIG. 3, the processor unit 103n can perform data transfer in the time slots 543a, and 543b . . . 543m. For example, when the processor unit 103n of FIG. 3 needs to transfer more data than other processor units 103a and 103b, by assigning plural time slots, for example, third and fourth time slots, to the processor unit 103n, the processor unit 103n can perform data transfer by using the time slots 543n; 544a, 543b, 544b . . . 543m, and 544m. As a result, the processor unit 103n can transfer twice more data than the processor units 103a and 103b can. Preferably, the assignment of the time slots may be decided by the main processor, which notifies in advance the processor units 103 and the external interface 102 of the assigned time slots by using the control bus.

Though the example that four time slots are set is described above, any number of time slots may be set. The number of signal lines constituting the signal line 510 may be one or plural. In this embodiment, since the processor units transmit and receive transfer data in respectively assigned time slots, data transfer can be performed even if address information is not attached. In this case, the effect of reducing overhead is obtained.

Figure 7:
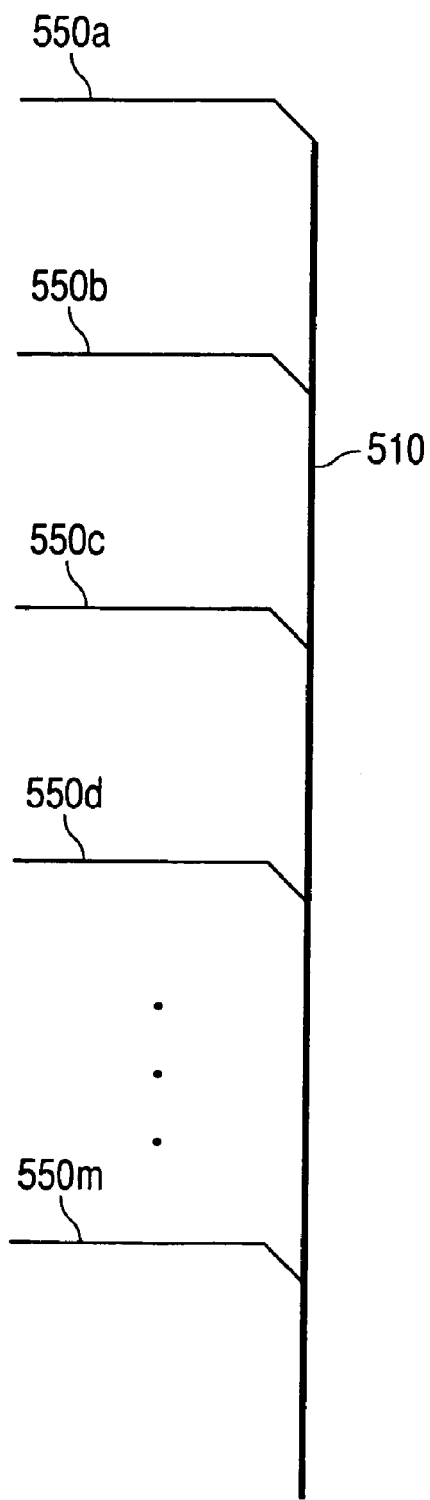
FIG. 7 is a drawing showing a second example of a method of sharing a signal line of a data bus.

FIG. 7 shows a second example of a method of sharing the signal line 510. The same is also true for a method of sharing the signal line 511. In this example, as shown in FIG. 7, the signal line 510 comprises plural signal lines 550a, 550b . . . 550m, which are assigned to the processor units so that the signal line 510 is shared by plural processor units. Specifically, for example, by assigning the signal line 550a to the processor unit 103a of FIG. 3, the processor unit 103a can perform data transfer using the signal line 550a. Similarly, for example, by assigning the signal line 550b to the processor unit 103b of FIG. 3, the processor unit 103b can perform data transfer using the signal line 550b. By assigning the signal line 550c to the processor unit 103n of FIG. 3, the processor unit 103n can perform data transfer using the signal line 550c.

When the quantity of data transfer required by, e.g., the processor unit 103a of FIG. 3 increases because of the speedup of the radio communication system, by assigning the signal line 550d as well as the conventional signal line 550a to the processor unit 103a, the request of the processor unit 103a for an increase in data transfer quantity can be satisfied. Preferably, the assignment of the signal lines may be decided by the main processor, which notifies in advance the processor units 103 and the external interface 102 of the assigned signal lines by using the control bus. In this embodiment, since the processor units transmit and receive transfer data in respectively assigned signal lines, data transfer can be performed even if address information is not attached. In this case, the effect of reducing overhead is obtained.

In the construction of FIG. 3 as described above, transmission/receive data transferred between each processor unit and the external interface 102 passes through the common shared signal lines 510 and 511. Accordingly, the number of signal lines can be reduced, and the hardware scale can be made smaller than that of the example of FIG. 2. (Also in the construction of FIG. 7, if the number m of signal lines is made to be smaller than the number n of processors, the hardware scale can be made smaller than that of the example of FIG. 2.) Like the above-mentioned example, by changing the number of time slots and signal lines that are assigned, it is possible to constitute a data bus suitable for a data transfer quantity required by the processor units. As a result, by providing the data bus of the construction of FIG. 3, a software defined radio with a high degree of freedom can be achieved in a hardware scale smaller than that of the example of FIG. 2.

Figure 4:
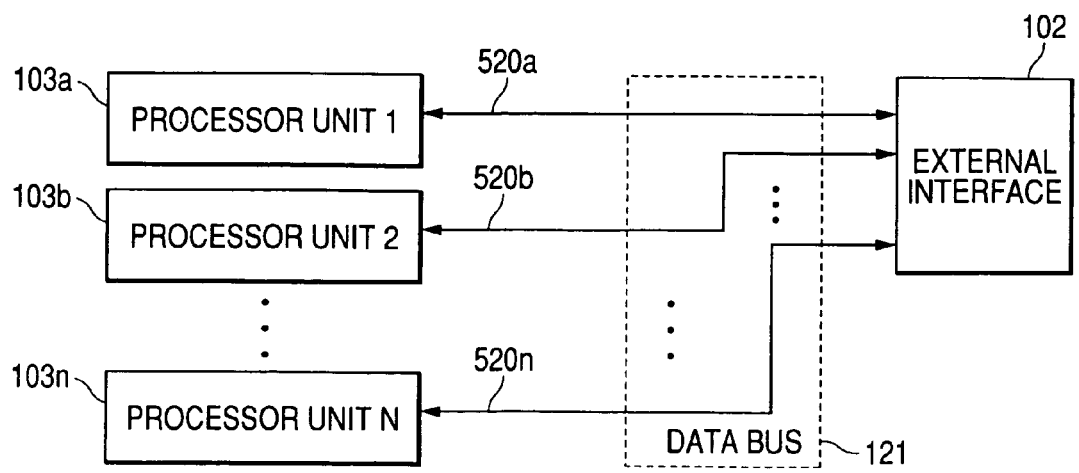
FIG. 4 is a drawing showing a third example of the construction of a data bus.

FIG. 4 shows a third example of the construction of the data bus 121. In FIG. 4, signals outputted from the processor unit 103a and signals inputted to the processor unit 103a are transferred to and from the external interface 102 through a shared signal line 520a. Likewise, signals inputted to and outputted from the processor units 103b and 103n are transferred to and from the external interface 102 using the signal lines 520b and 520n, respectively, The signal lines 520a, 520b, and 520n may be shared using the methods shown in FIGS. 6 and 7.

Specifically, for example, the signal line 520a is split into time slots, or constituted by plural signal lines so that the time slots and signal lines are assigned to the input and output of the processor unit 103a, respectively. The data bus 121 is constituted by a set of independent signal lines 520a-n.

As described above, in the construction of FIG. 4, transmission/receive data transferred between each processor unit and the external interface 102 passes through one shared signal line. Therefore, the number of signal lines can be reduced, and the hardware scale can be made smaller than that of the example of FIG. 2. Like the above-mentioned example, by changing the number of time slots and signal lines that are assigned, it is possible to constitute a data bus suitable for data transfer quantities required by the input and output of the processor units. As a result, by providing the data bus of the construction of FIG. 4, a software defined radio with a high degree of freedom can be achieved in a hardware scale smaller than that of the example of FIG. 2. In this embodiment, since the processor units are connected with the external interface 102 by dedicated signal lines, data transfer can be performed even if address information is not attached. In this case, the effect of reducing overhead is obtained.

Figure 5:
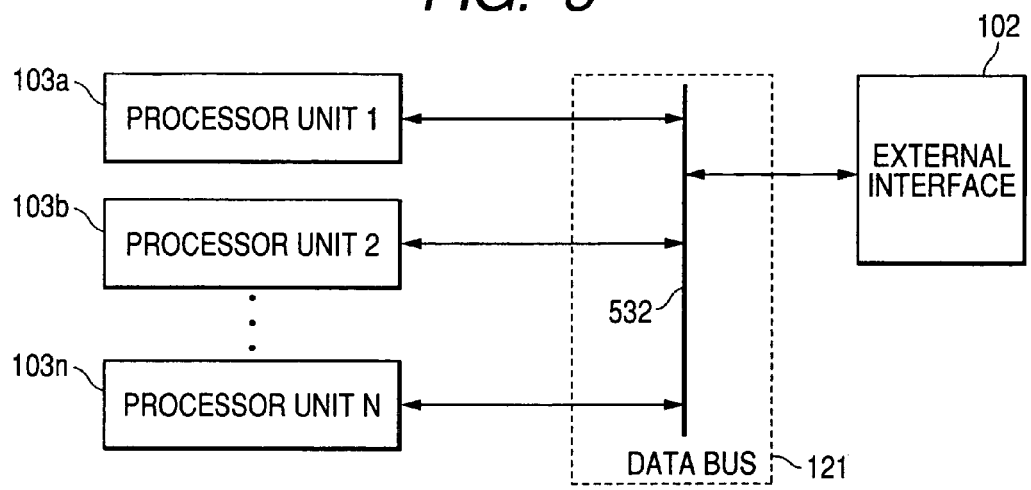
FIG. 5 is a drawing showing a fourth example of the construction of a data bus.

FIG. 5 shows a fourth example of the construction of the data bus 121. In FIG. 5, signals outputted from the processor units 103a, 103b, and 103n, and signals inputted to the processor units 103a, 103b, and 103n are all transferred to and from the external interface 102 through a shared signal line 532. As a method of sharing the signal line 532, the above-mentioned method shown in FIGS. 6 and 7 may be used. Specifically, for example, the signal line 532 is split into time slots, or constituted by plural signal lines so that the time slots and signal lines are assigned to the processor units, and their input and output, respectively.

As described above, in the construction of FIG. 4, transmission/receive data transferred between all the processor units and the external interface 102 passes through one shared signal line. Therefore, the number of signal lines can be reduced, and the hardware scale can be made smaller than that of the examples of FIGS. 3 and 4. Like the above-mentioned example, by changing the number of time slots and signal lines that are assigned, it is possible to constitute a data bus suitable for data transfer quantities required by the input and output of the processor units. As a result, by providing the data bus of the construction of FIG. 4, a software defined radio with a high degree of freedom can be achieved in a hardware scale smaller than that of the examples of FIGS. 3 and 4. In this embodiment, since the processor units send and receive transfer data by through respectively assigned time slots or signal lines, data transfer can be performed even if address information is not attached. In this case, the effect of reducing overhead is obtained.

Hereinbefore, a description has been made of embodiments in which the data bus 121 is operated in a way different from the control bus 120. Like the control bus 120, the data bus 121 may be formed as a general-purpose bus. Transfer of control signals and transmission/receive data over different buses would help to transfer the control signals without delay. However, the transfer capability of the data bus 121 must be higher than that of the control bus 120 because it must be able to accommodate the communication speed of transmission/receive data.

In FIG. 1, the processor units 103a and 103b are connected through an interunit interface 118. The interunit interface 118 is used to transfer control signals and data signals between the processor units 103a and 103b. Signals transferred using the interunit interface 118 include clock signal, and synch signals required for synchronous operation of the processor units 103a and 103b. Signal transfer may be performed using the interunit interface 118 when the result of signal processing performed by one processor unit 103a is transferred to another processor unit, for example, when the processor unit 103a performs demodulation processing, while the processor unit 103b performs error correction processing.

Figure 8:
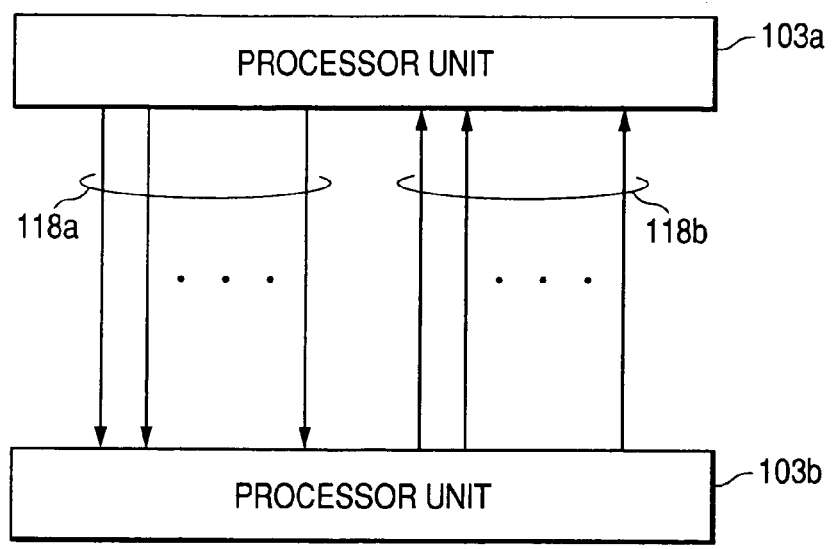
FIG. 8 is a drawing showing an example of the construction of an interunit interface.

FIG. 8 shows an example of the construction of the interunit interface 118. In the example of FIG. 8, as an interunit interface, a signal line 118a outputted from the processor unit 103a, and a signal line 118b inputted to the processor unit 103b are provided in advance. The number of signal lines constituting the signal lines 118a and 118b may be one or plural. What signal to be assigned to each signal line is decided by the main processor 100 according to functions assigned to the processor units 103a and 103b, and the main processor 100 may notify the processor units of the assignment over the control bus.

Figure 9:
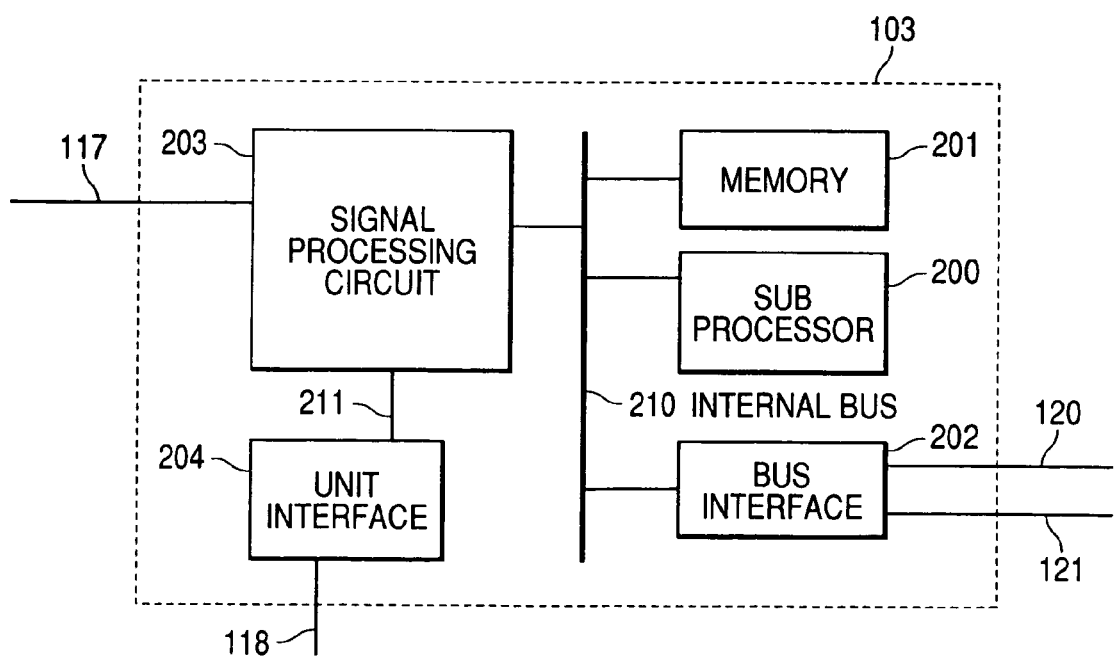
FIG. 9 is a drawing showing an example of the construction of a processor unit.

FIG. 9 shows an example of the construction of the processor unit 103 (indicated by 103a and 103b in FIG. 1). The processor unit 103 comprises a sub-processor 200, a memory 201, a bus interface 202, a signal processing circuit 203, and a unit interface 204. The components are connected with each other through an internal bus 210. In the example of FIG. 9, the unit interface 204 is connected with only the signal processing circuit 203 through a signal line 211, but may be connected with the internal bus 210 as well. The bus interface 202 is connected with the control bus 120 and the data bus 121. The signal processing circuit 203 is connected through the signal line 117 with an analog front-end that provides an interface between analog and digital signals, a radio signal processing unit that modulates and demodulates analog signals, and an antenna unit that transfers and receives signals of radio frequency. The signal processing circuit 203 performs baseband processing on transmission/receive signals.

In FIG. 9, for simplicity, the above-mentioned analog front-end, the radio signal processing unit, and the antenna are not shown. A unit interface 204 is connected with a unit interface of other processor units through a signal line 118. The processor unit 103 may be one that is designed to support a fixed communication protocol, or a processor unit for a software defined radio that is designed to support different communication protocols by modifying software stored in the memory 201 or the memory 101 of FIG. 1.

A sub-processor 200 controls the whole processor unit 103. The sub-processor 200, mainly in conjunction with the signal processing circuit 203, performs signal processing such as frame processing of radio communication that is comparatively severe in time restriction, and signal processing such as adaptive antenna control that is comparatively fast and requires complex operations. As the sub-processor 200, for example, a common DSP may be used.

The memory 201 is a work memory used when the sub-processor 200 performs signal processing. The memory 201 may also be used as a buffer area for exchanging signals between the sub-processor 200 and the signal processing circuit 203. The memory 201 may also store the program and construction data that define the operation of the sub-processor 200 and the signal processing circuit 203. As the memory 201, for example, a general-purpose SRAM and DRAM may be used. The bus interface 202 provides an interface through which the processor unit 103 transfers signals to and from other components of the software defined radio of the present invention over the control bus 120 and the data bus 121.

Figure 10:
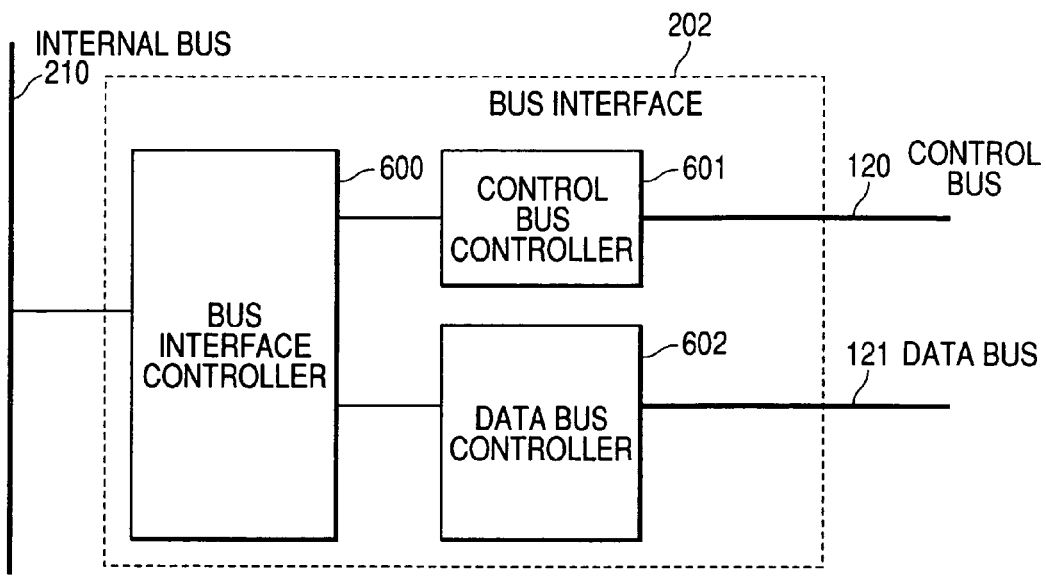
FIG. 10 is a drawing showing an example of the construction of a bus interface in a processor unit.

FIG. 10 shows an example of the construction of the bus interface 202. The bus interface control unit 600 controls access to the bus interface 202 that is performed through the internal bus 210. Specifically, for example, when the processor unit 103 outputs data to the control bus 120 or the data bus 121 through the bus interface 202, the bus interface control unit 600 operates as described. The bus interface control unit 600 decodes an address specified from the internal bus 210, and when the address is contained in an address space allocated to the control bus 120, outputs data to a control bus controller 601. When the address is contained in the address space allocated to the data bus 121, the bus interface control unit 600 outputs data to a data bus controller 602. As an address specified from the internal bus 210, an address for identifying a memory and a register included in the components shown in FIG. 1 such as the memory 101 and the external interface 102 may be used. Moreover, as an address specified from the internal bus 210, an address for identifying a memory and a register included in the bus interface 202 may be used. In this case, the bus interface control unit 600 may, if necessary, output an address, a control signal, and the like used in the control bus and the data bus to the control bus controller 601 and the data bus controller 602.

When the processor unit 103 inputs data from the control bus 120 or the data bus 121 through the bus interface 202, the bus interface control unit 600 operates as described. The bus interface control unit 600 decodes an address specified from the internal bus 210, and when the address is contained in an address space allocated to the control bus 120, reads data from the control bus controller 601. When the address is contained in the address space allocated to the data bus 121, the bus interface control unit 600 reads data from the data bus controller 602. As an address specified from the internal bus 210, an address for identifying a memory and a register included in the components shown in FIG. 1 such as the memory 101 and the external interface 102 may be used. Moreover, as an address specified from the internal bus 210, an address for identifying a memory and a register included in the bus interface 202 may be used. In this case, the bus interface control unit 600 may, if necessary, output an address, a control signal, and the like used in the control bus and the data bus to the control bus controller 601 and the data bus controller 602.

The external interface 102 also includes a bus interface having the same construction and operation as the bus interface of the processor units.

The control bus controller 601 performs control for transferring data through the control bus 120, according to the protocol of the control bus 120. Specifically, for example, when a PCI bus is used as the control bus 120 as described previously, the control bus controller 601 transfers addresses, data, and control signals for performing data transfer processing prescribed in the PCI bus. The control bus controller 601 may include a memory if necessary.

The data bus controller 602 performs processing for transferring data through the data bus 121, according to the protocol of the data bus 121. Specifically, for example, when the examples shown in FIGS. 2 to 7 are used as the data bus 121, the data bus controller 602 manages the assignment of time slots shown in FIG. 6 and signal lines shown in FIG. 7, and transfers data using time slots and signal lines assigned to a relevant processor unit. The data bus controller 602 may include a memory if necessary. As described in FIGS. 2 to 7, since address information may be omitted for transfer over the data bus, the data bus controller 602 can transmit and receive data without using address information, using time slots and signal lines assigned to a relevant processor unit.

Figure 11:
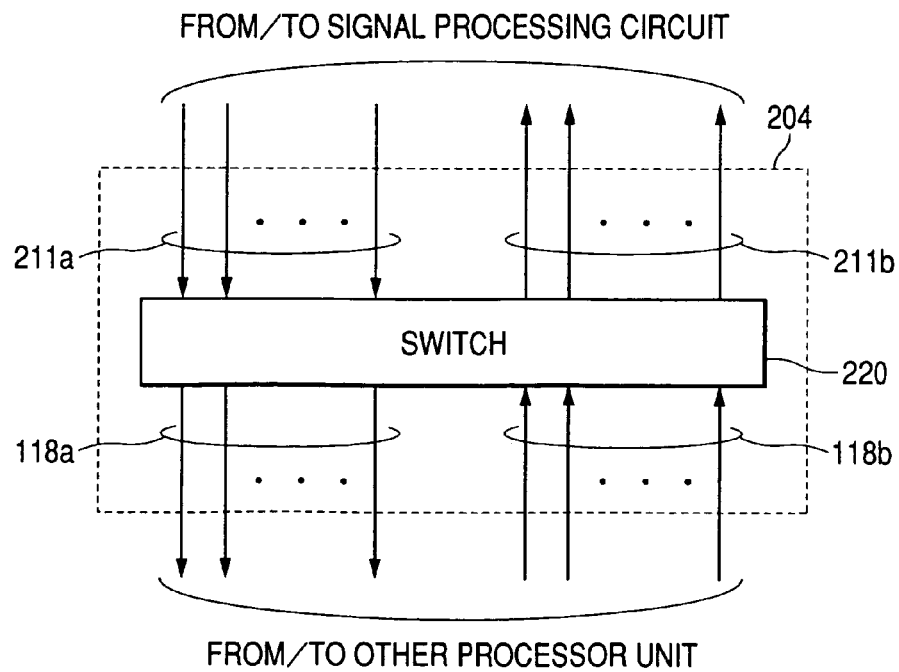
FIG. 11 is a drawing showing an example of the construction of a unit interface in a processor unit.

The signal processing circuit 203 of FIG. 9 performs signal processing such as waveform shaping and spectral spreading that are very fast and severe in time restriction. The signal processing circuit 203 may be comprised of, for example, a dedicated LSI and FPGA singly or in combination. The unit interface 204 of FIG. 9 provides an interface for performing signal transfer between the processor units through the inter-unit interface 108. FIG. 11 shows an example of the construction of the unit interface 204. The switch 220 connects signal lines of a signal line 211a inputted from the signal processing circuit 203 with desired signal lines of a signal line 118a outputted to another processor unit. Moreover, the switch 220 connects signal lines of the signal line 118b inputted from another processor unit with desired signal lines of a signal line 211b outputted to the signal processing circuit 203. Control on the connection of signal lines in the switch 220 may be performed in the signal processing circuit 203, the sub-processor 200, or the main processor 100.

Figure 12:
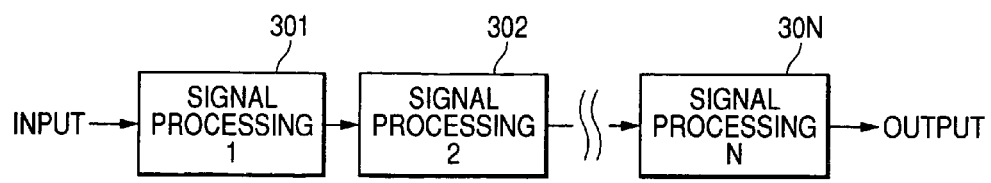
FIG. 12 is a drawing characteristics of signal processing of radio communication.
Figure 13:
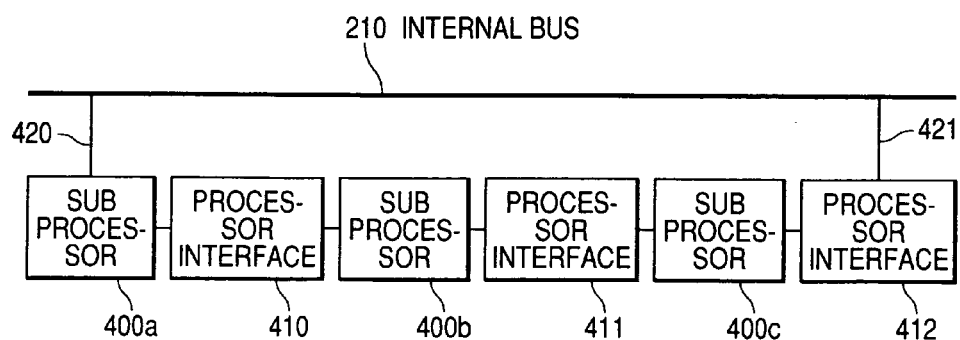
FIG. 13 is a drawing showing an example of a method of connecting plural sub-processors.
Figure 14:
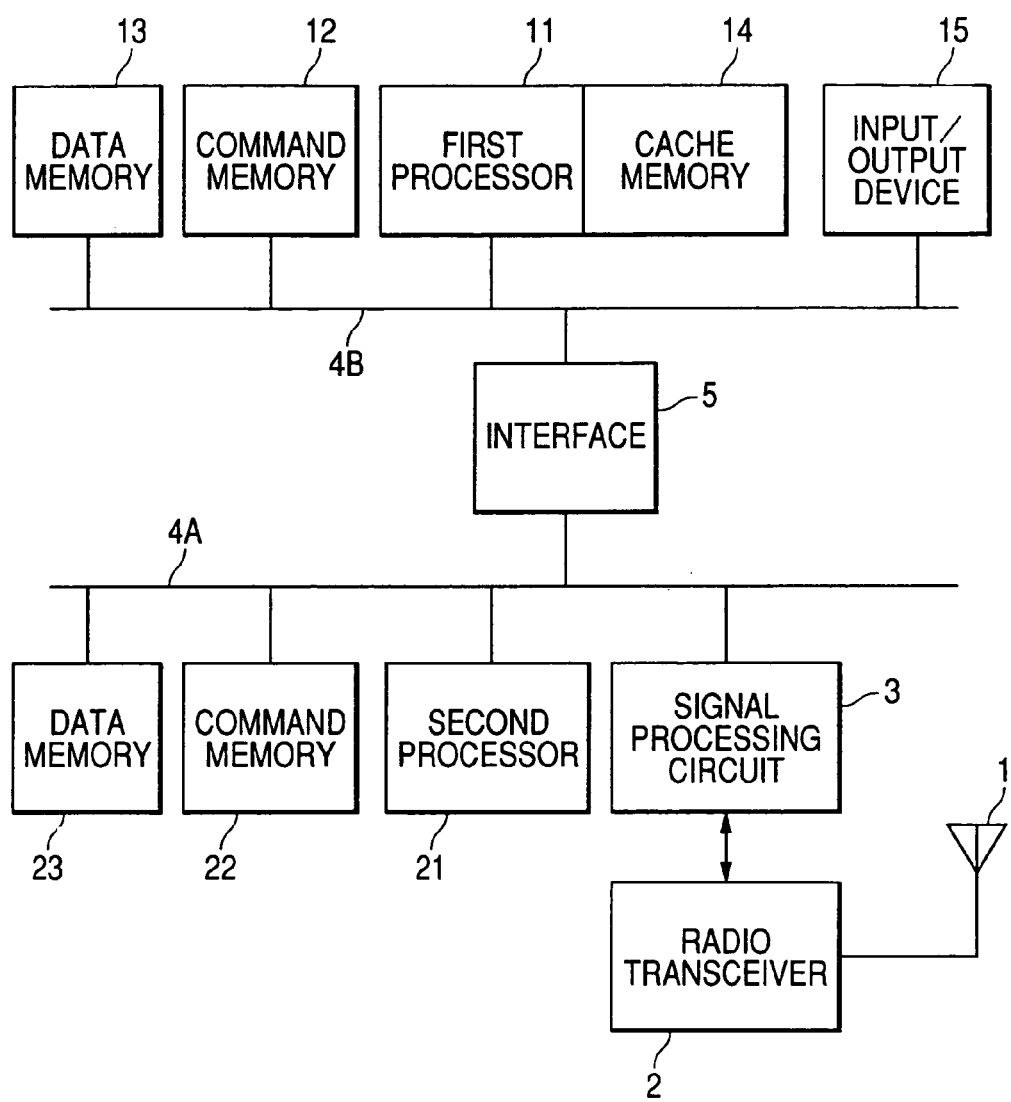
FIG. 14 is a drawing showing a first example of the construction of a conventional software defined radio.
Figure 15:
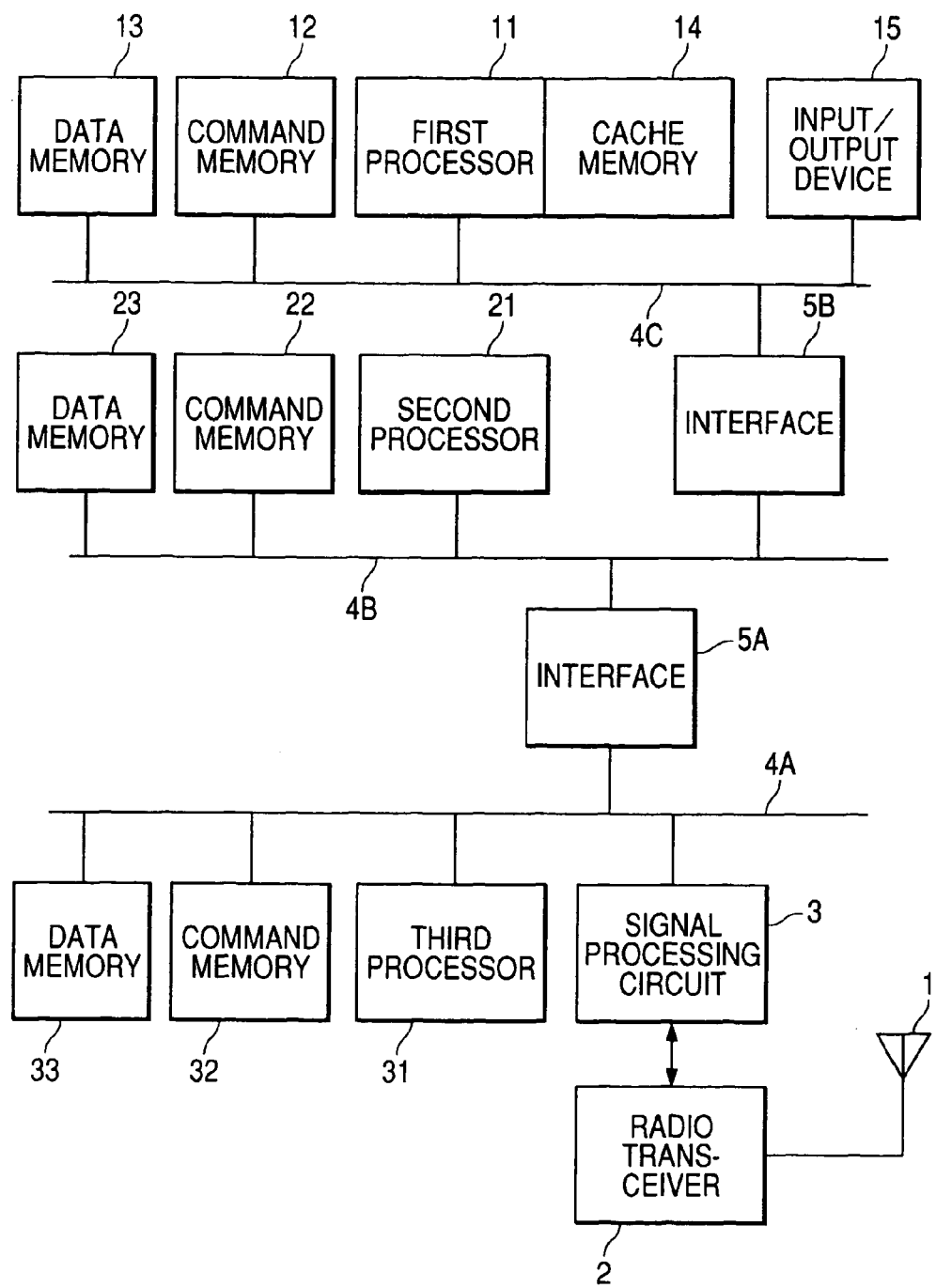
FIG. 15 is a drawing showing a second example of the construction of a conventional software defined radio.

As the internal bus 210, like the control bus 120, a PCI bus and a VME bus, which are general-purpose buses, may be used. Though the processor unit 103 shown in FIG. 9 includes one sub-processor 200, it may include plural sub-processors. Generally, in signal processing of radio communication, as shown in FIG. 12, plural signal processings 301, 302 ... 30N are performed in series. Accordingly, by using this characteristic, when signal processing of radio communication is performed by plural sub-processors, a method of connecting the sub-processors can be simplified. FIG. 13 shows an example of a method of connecting plural sub-processors included in the processor unit 103. In an example of FIG. 13, three sub-processors (400a, 400b, 400c) are connected serially through the three processor interfaces (410, 411, 412), and the first sub-processor 400a and the last processor interface 412 are connected with the internal bus 210 through signal lines 420 and 421, respectively. As the processor interfaces (410, 411, 412), for example, dual port memories may be used. Though not shown in FIG. 13, the processor interfaces 410 and 411 may be connected to the internal bus 210.

The following describes the operation of plural sub-processors connected as shown in FIG. 13. The first sub-processor 400a performs first signal processing for a signal inputted through the signal line 420 from the internal bus 210, and writes a result to the processor interface 410. The second sub-processor 400b reads the result of writing by the sub-processor 400a from the processor interface 410, performs second signal processing for the result, and writes a result to the processor interface 411. The third sub-processor 400c reads the result of writing by the sub-processor 400b from the processor interface 411, performs third signal processing for the result, and writes a result to the processor interface 412. The signal processing result written to the signal interface 412 is transferred to the components of the processor unit 103 of FIG. 9 such as the signal processing circuit 203 and the bus interface 202, through the signal line 421 and the data bus 210.

As described above, by connecting plural sub-processors in series for operation, signal processing of radio communication characterized by serial processing shown in FIG. 12 can be realized. Though three sub-processors are connected the example of FIG. 13, the number of sub-processors connected may be a number other than three.

What is claimed is:

1. A wireless communication device comprising:
   a main processor to control the wireless communication device;
   a memory utilized by the main processor;
   an external interface to input and output signals sent and received between the wireless communication device and other wireless communication devices;
   a plurality of processor units to process the input and output signals;
   a control bus, connected to the main processor, the memory, the external interface, and the plurality of processor units, to transfer control signals among the main processor, the memory, the external interface, and the plurality of processor units; and
   a data bus, connected to the external interface and the plurality of processor units, to transfer data signals among the external interface and the plurality of processor units,
   wherein each processor unit includes a unit interface which is connected via a unit signal line to other processor units, the unit signal line being a different component from the control bus and from the data bus.

2. The wireless communication device according to claim 1,
   wherein the data bus includes, for each of the processor units, a first signal line to transfer signals from each of the processor units to the external interface and a second signal line to transfer signals from the external interface to each of the processor units, each processor unit including a separate first signal line and a separate second signal line corresponding to the processor unit.

3. The wireless communication device according to claim 1,
   wherein the data bus includes a signal line both to transfer signals from each of the processor units to the external interface, and to transfer signals from the external interface to each of the processor units; and
   wherein each processor unit includes a separate signal line corresponding to the processor unit.

4. The wireless communication device according to claim 1,
   wherein the data bus includes a first signal line to transfer signals from the plurality of processor units to the external interface and a second signal line to transfer signals from the external interface to the plurality of processor units; and wherein the plurality of processor units share the first signal line, and the plurality of processor units share the second signal line.

5. The wireless communication device according to claim 4, wherein time slots are allocated to the first signal line and the second signal line to allocate signal line usage according to time, a respective time slot is allocated to each processor unit, and each processor unit transfers signals in the respectively allocated time slot by utilizing a signal line corresponding to the respectively allocated time slot.

6. The wireless communication device according to claim 4, wherein the first signal line and the second signal line include a plurality of signal lines, and at least one signal line among the plurality of signal lines is allocated to each of the processor units, and the processor units each utilize the respective allocated at least one signal line to transfer signals.

7. The wireless communication device according to claim 1, wherein the data bus includes a signal line both to transfer signals from the plurality of processor units to the external interface, and to transfer signals from the external interface to the plurality of processor units; and wherein the plurality of processor units share the signal line.

8. The wireless communication device according to claim 7, wherein time slots are allocated to the signal lines to allocate signal line usage according to time, wherein a respective time slot is allocated to each of the processor units; and wherein each processor unit transfers signals in the respectively allocated time slot by utilizing a signal line corresponding to the respectively allocated time slot.

9. The wireless communication according to claim 7, wherein at least one signal line among the plurality of signal lines is allocated to each of the processor units, and the processor units each utilize the respective allocated at least one signal line to transfer signals.

10. The wireless communication device according to claim 1, wherein each processor unit includes:

at least one subprocessor to control at least the processor unit which includes the at least one subprocessor;

a memory utilized by the at least one subprocessor;

a signal processor circuit to perform signal processing;

a bus interface to control the transfer of signals by the processor unit via the control bus and the data bus; and an internal bus connected to the at least one subprocessor, the memory, the signal processor circuit, and the bus interface;

wherein the unit interface transfers signals between the processor unit and other processor units via the unit signal line.

11. The wireless communication device according to claim 1, wherein the wireless communication devices are radio communication devices.

12. The wireless communication device according to claim 11, wherein the radio communication devices are selected from the group consisting of cellular communication devices, wireless LAN devices, and DSRC (Dedicated Short Range Communication) devices.

13. The wireless communication device according to claim 1, wherein the unit interface of the processor unit, which is connected to both the control bus and the data bus, is connected via the unit signal line to at least one other processor unit which is connected to both the control bus and the data bus.

* * * * *

UNITED STATES PATENT AND TRADEMARK OFFICE
CERTIFICATE OF CORRECTION

PATENT NO. : 8,165,620 B2  
APPLICATION NO. : 11/209713  
DATED : April 24, 2012  
INVENTOR(S) : Katsuhiko Tsunehara et al.

Page 1 of 1

It is certified that error appears in the above-identified patent and that said Letters Patent is hereby corrected as shown below:

ON THE TITLE PAGE

Please correct (75) Inventors: to read as follows:

(75) Inventors: Katsuhiko Tsunehara, Hachioji (JP);  
Hirotake Ishii, Hachioji (JP);  
Manabu Kawabe, Hachioji (JP);  
Takashi Ishikawa, Nishitokyo (JP)

Signed and Sealed this  
Seventeenth Day of July, 2012

David J. Kappos  
*Director of the United States Patent and Trademark Office*